(12) United States Patent
Grabinger et al.

(10) Patent No.: US 8,364,318 B2
(45) Date of Patent: Jan. 29, 2013

(54) DEMAND CONTROL VENTILATION WITH FAN SPEED CONTROL

(75) Inventors: Cory Grabinger, Maple Grove, MN (US); Paul Wacker, Plymouth, MN (US); Todd Kreft, Richfield, MN (US); Adrienne Thomle, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 309 days.

(21) Appl. No.: 12/764,446

(22) Filed: Apr. 21, 2010

(65) Prior Publication Data

US 2011/0264274 A1 Oct. 27, 2011

(51) Int. Cl.
*G05B 15/00* (2006.01)
*F24F 11/04* (2006.01)

(52) U.S. Cl. .................... 700/276; 454/256; 454/333

(58) Field of Classification Search .......... 700/276, 700/278, 282, 300; 236/49.3, 51, 91 D; 454/229, 454/256; 165/244, 247, 251
See application file for complete search history.

(56) References Cited

U.S. PATENT DOCUMENTS

| | | | |
|---|---|---|---|
| 3,979,922 A | 9/1976 | Shavit | |
| 4,182,180 A | 1/1980 | Mott | |
| 4,267,967 A * | 5/1981 | Beck et al. | 236/49.3 |
| 4,347,712 A | 9/1982 | Benton et al. | |
| 4,379,484 A | 4/1983 | Lom et al. | |
| 4,389,853 A * | 6/1983 | Hile | 165/251 |
| 4,423,364 A | 12/1983 | Kompelien et al. | |
| 4,495,986 A * | 1/1985 | Clark et al. | 454/267 |
| 4,570,448 A | 2/1986 | Smith | |
| 4,580,620 A | 4/1986 | Fukumoto et al. | |
| 4,605,160 A | 8/1986 | Day | |
| 5,276,630 A | 1/1994 | Baldwin et al. | |
| 5,292,280 A | 3/1994 | Janu et al. | |
| 5,719,408 A | 2/1998 | Yamamoto et al. | |
| 5,762,420 A | 6/1998 | Mills | |
| 5,791,408 A | 8/1998 | Seem | |
| 5,801,940 A | 9/1998 | Russ et al. | |
| 6,006,142 A | 12/1999 | Seem et al. | |
| 6,161,764 A | 12/2000 | Jatnicks | |
| 6,223,544 B1 | 5/2001 | Seem | |
| 6,249,100 B1 | 6/2001 | Lange | |
| 6,415,617 B1 | 7/2002 | Seem | |
| 6,609,967 B2 | 8/2003 | Sharp et al. | |
| 6,778,945 B2 | 8/2004 | Chassin et al. | |
| 6,826,920 B2 | 12/2004 | Wacker | |
| 6,988,671 B2 | 1/2006 | DeLuca | |

(Continued)

FOREIGN PATENT DOCUMENTS

| WO | 9014556 | 11/1990 |
|---|---|---|
| WO | 2009061293 | 5/2009 |

OTHER PUBLICATIONS

California Energy Commission, "2008 Building Energy Efficient Standards for Residential and Nonresidential Buildings," 176 pages, Dec. 2008.

(Continued)

*Primary Examiner* — Charles Kasenge
(74) *Attorney, Agent, or Firm* — Seager Tufte & Wickhem LLC (57) ABSTRACT

A method and system for operating a demand control ventilation system with a multi-speed fan is disclosed. The control system may modulate the fan speed of a multi-speed fan and/or the position of a ventilation damper in order to achieve desired ventilation levels for a building.

19 Claims, 4 Drawing Sheets

U.S. PATENT DOCUMENTS

| | | | |
|---|---|---|---|
| 7,398,821 B2 * | 7/2008 | Rainer et al. | 454/258 |
| 7,434,413 B2 | 10/2008 | Wruck | |
| 7,758,407 B2 * | 7/2010 | Ahmed | 454/256 |
| 2002/0124992 A1 * | 9/2002 | Rainer et al. | 165/247 |
| 2006/0107670 A1 | 5/2006 | Thomle et al. | |
| 2006/0117769 A1 | 6/2006 | Helt et al. | |
| 2006/0130502 A1 | 6/2006 | Wruck et al. | |
| 2007/0037507 A1 * | 2/2007 | Liu | 454/229 |
| 2007/0084938 A1 * | 4/2007 | Liu | 236/91 D |
| 2007/0289322 A1 | 12/2007 | Mathews | |
| 2008/0076346 A1 * | 3/2008 | Ahmed | 454/256 |
| 2009/0210096 A1 * | 8/2009 | Stack et al. | 700/278 |
| 2010/0057258 A1 * | 3/2010 | Clanin | 700/276 |
| 2011/0046790 A1 * | 2/2011 | Miller et al. | 700/276 |

OTHER PUBLICATIONS

California Energy Commission, "Reference Appendices for the 2008 Building Energy Efficient Standards for Residential and Nonresidential Buildings," 363 pages, Dec. 2008, revised Jun. 2009.

http://content.honeywell.com/building/components/pr/econstudy.asp., "Honeywell Hvac—Economizer Study," 3 pages, printed Oct. 21, 2004.

Honeywell, Fresh Air ECONOMIZER™ Systems, 2 pages, 1999.

Honeywell, "W7212, W7213, W7214 Economizer Logic Modules for Ventilation Control," Product Data, 16 pages, 2004.

Honeywell, "W7212, W7213, W7214 Economizer Logic Modules for Ventilation Control," Product Data, 24 pages, revised Mar. 2010.

Kingrey et al., "Checking Economizer Operation," Washington State University Extension Energy Program, 3 pages, Feb. 6, 2009.

New Buildings Institute, "Commercial Rooftop HVAC Energy Savings Research Program, Draft(A) Final Project Report," 99 pages, Mar. 25, 2009.

PurpleSwift, "DC6 AHU Economizer Unit," 2 pages, downloaded Jul. 1, 2010.

Rooftop Systems, Inc., "Economizer Catalog, Version 1.1," 20 pages, downloaded Jul. 1, 2010.

Taylor, "Comparing Economizer Relief Systems," ASHRAE Journal, pp. 33-42, Sep. 2000.

http://www.automatedbuildings.com/releases/mar09/090312111454honeywell.htm, "Honeywell Introduces Economizer Savings Tool and Selectable Dry Bulb Temperature Sensor to Reduce Energy Consumption," 2 pages, Mar. 2009.

http://www.pexsupply.com/Honeywell-W7210A1001-Series-72-Economizer-TwoSPDT . . . , "Series-72-Economizer-TwoSPDT One 2-10VDC," SKU: W7210A1001, 2 pages, printed Sep. 7, 2010.

U.S. Appl. No. 12/890,380, filed Sep. 24, 2010.

U.S. Appl. No. 12/890,396, filed Sep. 24, 2010.

Honeywell, "Product Information Sheet," pp. 134-135, prior to Sep. 24, 2010.

Honeywell, "W6210A,D and W7210A,D Solid State Economizer Logic Module," Product Data, 24 pages, prior to Sep. 24, 2010.

Carrier Corporation, "Getting More for Less, How Demand Controlled Ventilation Increases Air Quality and Reduces Costs," 7 pages, Dec. 1998.

U.S. Appl. No. 12/764,446, filed Apr. 21, 2010.

U.S. Appl. No. 12/764,415, filed Apr. 21, 2010.

U.S. Appl. No. 12/686,225, filed Jan. 12, 2010.

U.S. Appl. No. 12/828,889, filed Jul. 1, 2010.

U.S. Appl. No. 12/764,431, filed Apr. 21, 2010.

FEMP, "Demand-Controlled Ventilation Using $CO_2$ Sensors," Federal Technology Alert, A New Technology Demonstration Publication, 28 pages, Mar. 2004.

Honeywell, "Building Control Systems, Use of Demand Control Ventilation in Your HVAC System," 1 page, Nov. 2005.

* cited by examiner

DEMAND CONTROL VENTILATION WITH FAN SPEED CONTROL

TECHNICAL FIELD

The disclosure relates generally to Heating, Ventilation, and Air Conditioning (HVAC) systems for conditioning the air of an inside space of a building or other structure, and more particularly, to demand control ventilation systems.

BACKGROUND

Most modern buildings use some sort of an HVAC system to control the environment conditions inside of the building. Such HVAC systems can be configured to control a number of different environmental conditions including, for example, temperature, humidity, air quality and/or other environmental conditions, as desired. In many HVAC systems, air from the building's inside space is drawn into return ducts and provided back to the HVAC system, where the return air is conditioned and provided back to the inside space. To meet desired ventilation requirements, some HVAC systems include demand control ventilation systems (DCV). Such systems often include an exhaust port for exhausting at least some of the return air to the outside environment, and/or an intake port for bringing fresh air into the HVAC system. In some instances, a damper system is provided to control how much return air is exhausted and/or how much outside air is brought into the building. As such, and in many instances, the air supplied by the HVAC system to the inside space can be a mixture of fresh outside air and return air, depending on the conditions.

In some cases, the exhaust and/or intake port can be part of an economizer unit, which in some instances can help provide the demand control ventilation function. That is, in addition to providing a desired level of ventilation to the building, such an economizer may, under certain conditions, act as a first stage of cooling to help decrease energy usage of the HVAC system. In one example, an economizer may draw in cooler outside air to provide essentially "free" cooling during some cooling cycles. In some cases, air flow is drawn through the economizer/DCV system by a plenum or other fan or blower of the HVAC system.

SUMMARY

The disclosure relates generally to Heating, Ventilation, and Air Conditioning (HVAC) systems for conditioning the air of an inside space of a building or other structure, and more particularly, to demand control ventilation systems that are capable of drawing outside air into an HVAC air stream. In some illustrative embodiments, the operation of a multiple or infinite speed fan may be considered in demand control ventilation operations.

In an illustrative but non-limiting example, the disclosure provides a method for operating a demand control ventilation system (DCV) with a multiple or variable speed fan. The DCV may include a controller that is configured to receive two or more ventilation settings (e.g. maximum required ventilation and minimum required ventilation). The DCV system may be calibrated at each of the two or more ventilation settings such that, during normal operation, the speed of the fan and/or one or more damper settings may be modulated by the controller to provide only a desired amount of ventilation, and in an energy efficient manner.

In a more particular example, a Demand Control Ventilation (DCV) system for a building may be provided that includes a multi-speed fan in fluid communication with an air inlet for drawing outside air into a building. A controller may be configured to control the speed of the multi-speed fan such that a desired flow of outside air is drawn through the air inlet and into the building, where the speed of the fan is dependent on the desired flow of outside air. In some instances, the controller may store a fan speed for each of two or more calibrated flows of outside air, and the controller may interpolate between the fan speeds for at least two of the calibrated flows of outside air to achieve the desired flow of outside air. The desired flow of outside air may be dependent on the occupancy or an expected occupancy of the building.

In another example, a Demand Control Ventilation (DCV) system for a building may be provided that includes a damper having a range of damper positions. The damper may control a flow of outside air into the building. A multi-speed fan may be provided in fluid communication with the damper for drawing outside air through the damper and into the building. A controller may be configured to control the position of the damper such that a desired flow of outside air is drawn through the damper and into the building, where the position of the damper may be dependent on both the desired flow of outside air and the speed of the multi-speed fan. In some cases, the controller may store a damper position and a fan speed for each of two or more calibrated flows of outside air, and during operation, the controller may interpolate between the damper positions and/or fan speeds for at least two of the calibrated flows to achieve the desired flow of outside air. Again, the desired flow of outside air may be dependent on the occupancy or an expected occupancy of the building.

The above summary is not intended to describe each disclosed embodiment or every implementation of the invention.

BRIEF DESCRIPTION OF THE DRAWINGS

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

While the invention is amenable to various modifications and alternative forms, specifics thereof have been shown by way of example in the drawings and will be described in detail. It should be understood, however, that the intention is not to limit aspects of the invention to the particular illustrative embodiments described. On the contrary, the intention is to cover all modifications, equivalents, and alternatives falling within the spirit and scope of the invention.

DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 1:
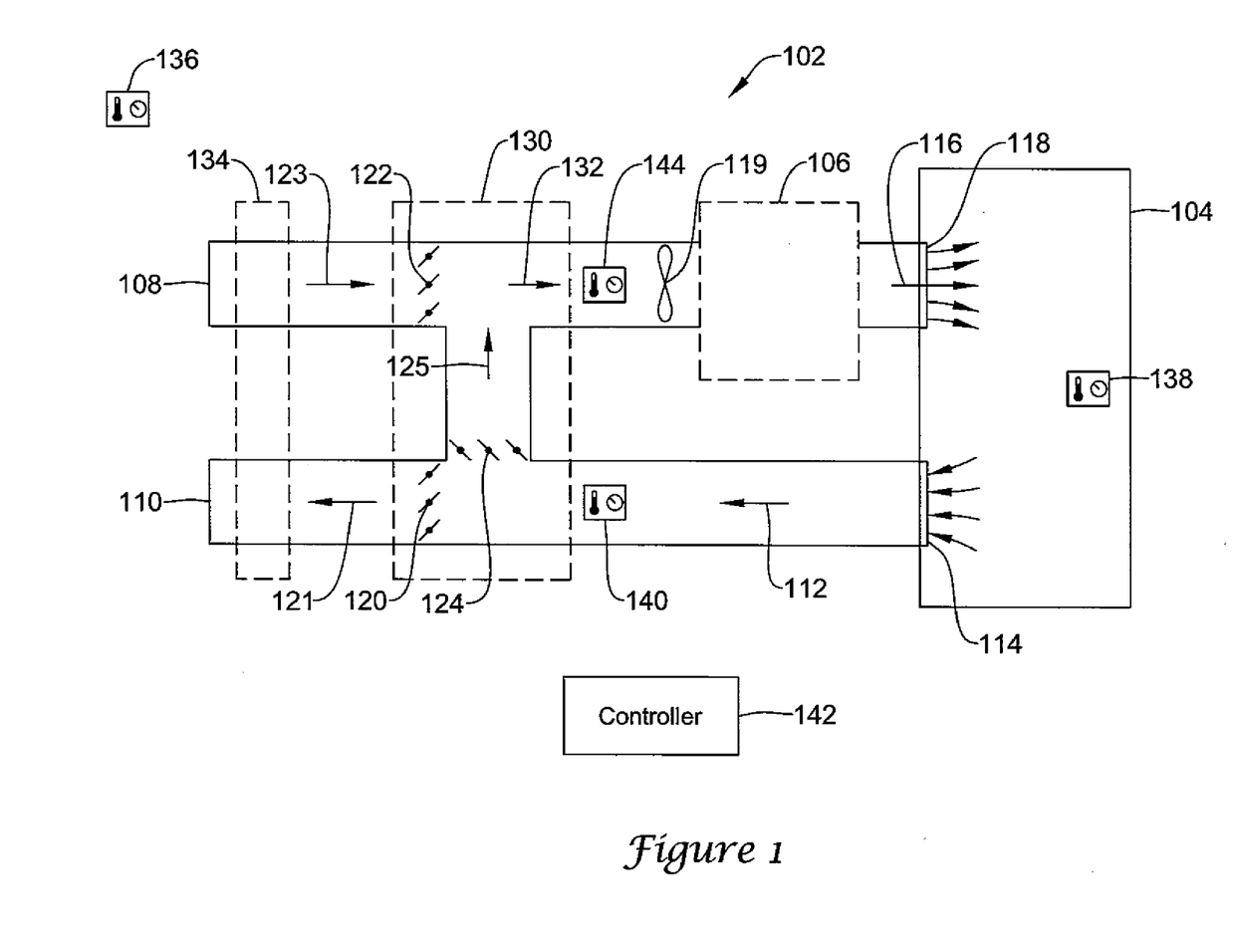
FIG. 1 is a schematic diagram showing an illustrative HVAC system of a building including an demand control ventilation (DCV) system.

FIG. 1 is a schematic diagram showing an illustrative Heating, Ventilation, and Air Conditioning (HVAC) system 102 of a building 104. The HVAC system 102 may include a Demand control ventilation (DCV) system 130. The building 104 may be a residential, commercial, or any other suitable building. The HVAC system 102 may include an HVAC unit 106, which in some cases may include one or more heating and/or cooling units. In some embodiments, the HVAC unit(s) 106 may be positioned at on rooftop (as in some commercial buildings) whereas in other embodiments, the HVAC unit(s) may be located within the building. In the illustrative embodiment shown, the Demand control ventilation (DCV) system 130 is part of an economizer, and is located upstream of the HVAC unit(s) 106. As shown, the Demand control ventilation (DCV) system includes an outside air intake 108 and/or an exhaust vent 110. A return air stream 112 may be provided for drawing return air from the inside space of the building 104 through one or more return registers 114. The illustrative HVAC system 102 also includes a fan 119, which may be a multiple or infinite speed fan, which can be controlled by a controller to induce a desired air flow through the HVAC unit 106 and to the building 104 as shown at 116 through one or more supply registers 118.

As shown, the Demand control ventilation (DCV) system 130 may employ one or more dampers to control air flows within the various ducts of the DCV of the HVAC system 102. These dampers may include an exhaust damper 120 to regulate the fraction of the return air stream 112 that is exhausted 121 from the building 104, an intake damper 122 to regulate the flow of an incoming outside air stream 123 into the building 104, and/or a return damper 124 to regulate the flow of the retained return air stream 125 to mix with the incoming outside air stream 123. In some cases, the dampers 120, 122, and/or 124 may be mechanically coupled together to open and close in a coordinated manner, but this is not required. For example, in some illustrative embodiments, dampers 120 and 122 may open and close together or in sequence, and damper 124 may open and close in an opposite manner to dampers 120 and 122. In some instances, when damper 122 is opened to allow more of the outside air stream 123 into the building 104, damper 120 may also open to allow a similar amount of the return air stream 112 to be exhausted 121 from the building 104. The return air damper 124 may close as the dampers 120 and 122 open. This arrangement may help balance the pressure inside the HVAC system 102 and building 104. In some illustrative embodiments, more or fewer of the dampers 120, 122, and 124 may be employed, but the teachings of this disclosure may be applied advantageously to any suitable HVAC system.

In some embodiments, the Demand control ventilation (DCV) system 130, including the dampers 120, 122, 124 and associated duct work, may be included in an economizer unit. Under some conditions, such an economizer unit may be used to provide a first stage of free cooling by mixing cooler incoming outside air 123 with the sometimes warmer retained return air 125 to provide a cooler mixed air stream 132 to the cooling coils of the HVAC unit 106. Note that in the present disclosure, "return air" may refer to the return air stream 112, before it has been (possibly) divided into an exhaust air stream 121 and a retained return air stream 125, and in other cases, "return air" or "return air stream" may refer to the retained return air stream, regardless of whether the retained return air stream includes the entire return air stream 112 or only a fraction thereof. It generally will be clear from context what "return air" refers to, and in the case of referring to the contribution of inside air to the mixed air stream 132, it generally is to be understood that the retained return air stream 125, which originates from the return air stream 112, may be referred to as "return air."

In some instances, the HVAC system 102 may include a heat exchanger generally shown at 134 to transfer heat energy between the incoming outside air stream 123 and the exhausted air stream 121, which may be useful under some operating conditions.

Decisions for when and how to use the DCV/economizer 130 may depend on strategies that consider current and/or past conditions of outside air and/or indoor air. In some instances, the HVAC system 102 of FIG. 1 may include one or more outdoor air sensors 136 for measuring one or more parameters of the outside air. Current economizer strategies are typically based on dry bulb temperature, enthalpy, a combination of the two, or a sensed enthalpy that approximates the two. These strategies generally base a decision to economize (e.g., whether to draw in outside air in amounts greater than those needed to meet Demand Control Ventilation requirements) only on the outside air temperature or enthalpy, and whether there is a need to cool the inside space of the building 104.

The HVAC system of FIG. 1 may include one or more inside air sensors 138 for measuring one or more parameters of the air of the inside space of the building 104. Alternatively, or in addition, one or more return air stream sensors 140 may be provided to measure parameters of the air of the inside space, given that the return air stream 112 is drawn from the inside space of the building 104. In some cases, a mixed air sensor 144 may be provided. Any of inside 138, return 140, mixed 144 and outside 136 sensors may be configured to determine one or more air parameters of interest, such as dry bulb temperature, wet bulb temperature, dew point (i.e., dew point temperature), relative humidity, and/or enthalpy (i.e., specific enthalpy), to name a few. Notably, these air parameters are not all independent. With appropriate assumptions (e.g., ideal gases, etc.), their interrelationship may be expressed through psychrometric equations and represented graphically, for example on a psychrometric chart, or numerically as desired. Some desired air parameters may be obtained from measurements of two other appropriately chosen air parameters. For example, dew point and/or enthalpy may be calculated from measured values of dry bulb temperature and relative humidity. In some illustrative embodiments, any of inside 138, return 140, mixed 144 and/or outside 136 sensors may be configured to measure or determine two or more air parameters selected from a set of parameters such as dry bulb temperature, dew point, relative humidity, and/or enthalpy.

A controller, such as controller 142, may be provided to control the HVAC system 102. Controller 142 may be any suitable controller. Controller 142 may be a controller for the entire HVAC system 102, or any appropriate subset or subsets of the HVAC system 102 such as the DCV system 130. Physically, it may be a stand-alone unit or units, or it may be integrated with hardware, such as with DCV 130. Controller 142 may be configured to receive information from any suitable source, such as the inside 138, return 140, mixed 144 and/or outside 136 sensors, and it may be configured to issue commands to any appropriate component of the HVAC system 102, such as dampers 120, 122, 124, fan 119, HVAC unit 106, etc. It is contemplated that controller 142 may be configured and programmed in any suitable manner.

Figure 2:
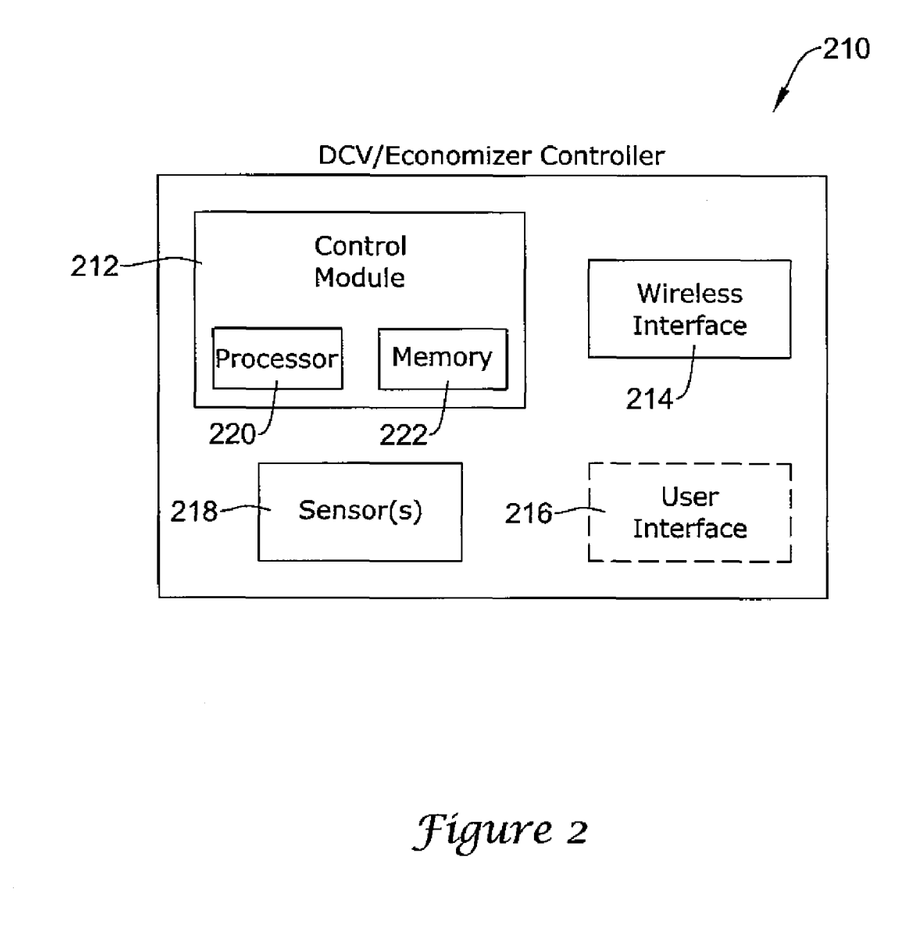
FIG. 2 is block diagram of an illustrative demand control ventilation (DCV) controller.

FIG. 2 is a block diagram of an illustrative DCV and/or Economizer controller 210, which may be used in conjunction with the HVAC system of FIG. 1. In the illustrative embodiment, the controller 210 may include a control module 212, a wireless interface 214, an optional user interface 216, and one or more sensors 218. However, this is just one example of a suitable controller. In some cases, the one or more sensors 218 may include a temperature sensor, a humidity sensor, a ventilation sensor, an air quality sensor (e.g. $CO_2$ sensors), and/or any other suitable HVAC building control system sensor, as desired. Temperature sensor(s) may be provided to sense the indoor and/or outdoor temperatures. Likewise, humidity sensor may be provided to sense the humidity indoor and/or outdoor. As illustrated, the one or more sensors 218 may be included with the Controller 210, such as within a housing of Controller 210. However, it is contemplated that one or more sensors 218 may be located remote from the Controller 210, but in communication therewith, if desired. Also, the Controller 210 may include a wired interface in addition to, or in place of, the wireless interface 214.

Control module 212 of the illustrative Controller 210 may be configured to help control the comfort level (i.e. heating, cooling, ventilation, and/or air quality, etc.) of at least a portion of the building or structure 104 by controlling one or more dampers 120, 122, 124 and/or activating one or more HVAC components 106, as in FIG. 1. In some instances, control module 212 may include a processor 220 and a memory 222. Control module 212 may be configured to control and/or set one or more HVAC functions, such as, for example, HVAC schedules, temperature setpoints, humidity setpoints, trend logs, timers, fan speeds, damper positions, environment sensing, and/or other HVAC functions or programs, as desired. In some cases, control module 212 may be used to configure one or more settings of the HVAC controller 142 of FIG. 1, such as, for example, HVAC controller schedules including ventilation schedules, temperature setpoints, humidity setpoints, trend logs, timers, fan speeds, damper positions, environment sensing, HVAC controller programs, user preferences, and/or other HVAC controller settings, as desired. In the illustrative embodiment, control module 212 may help control the comfort level of at least a portion of the building or structure using the temperature sensed by temperature sensor of the one or more sensors 218, when provided.

Memory 222 may be used to store any desired information, such as the aforementioned HVAC schedules, temperature setpoints, humidity setpoints, trend logs, timers, fan speeds, damper positions, environmental settings, and any other settings and/or information as desired. Control module 212 may store information within memory 222 and may subsequently retrieve the stored information. Memory 222 may include any suitable type of memory, such as, for example, random-access memory (RAM), read-only member (ROM), electrically erasable programmable read-only memory (EEPROM), Flash memory, or any other suitable memory, as desired. In some instances, memory 222 may store one or more control programs for execution by the processor 220.

Wireless interface 214 of the Controller 210 may be configured to wirelessly communicate (i.e. transmit and/or receive signals) with a wireless interface of one or more HVAC controllers (and/or HVAC components 106). For example, wireless interface 214 may be configured to communicate with a wireless interface of an HVAC controller and send and/or receive signals that corresponding to, for example, a temperature sensed by temperature sensor, a humidity sensed by the humidity sensor, heat and/or cool set points, fan settings including fan speeds, ventilation settings, indoor and/or outdoor air temperatures, equipment status, scheduling, trend logs, and/or any other suitable information and/or data. It is contemplated that the wireless interface 214 may include, for example, a radio frequency (RF) wireless interface, an infrared wireless interface, a microwave wireless interface, an optical interface, and/or any other suitable wireless interface, as desired. While a wireless interface 214 is shown in FIG. 2, it is contemplated that a wired interface may be used instead, or in addition to, the wireless interface 214.

The optional user interface 216 may be any suitable interface that is configured to display and/or solicit information as well as permit a user to enter data and/or other settings, as desired. In some cases, user interface 216 may allow a user or technician to program and/or modify one or more control parameters of Controller 210, such as programming a set point, a time, an equipment status and/or parameter, as desired. In some instances, the user interface 216 may include a touch screen, a liquid crystal display (LCD) panel and keypad, a dot matrix display, a computer, buttons and/or any other suitable interface, as desired. In one example, at least some of the parameters and/or settings may be transmitted to the Controller 210 via wireless interface 214.

In some embodiments, the HVAC system 102, such as illustrated in FIG. 1, may include a Controller 210 that is programmed to control ventilation to the building 104 based on actual occupancy using carbon dioxide ($CO_2$) sensors. Alternatively, or in addition, Controller 210 may be programmed to control ventilation to the building 104 based on a ventilation schedule, or a combination of actual occupancy and a ventilation schedule. In either case, it is contemplated that controller 210 may allow the ventilation rate to vary based on actual or scheduled occupancy, rather than requiring a maximum ventilation rate whenever occupancy is detected or expected. Because buildings are rarely, if ever, at maximum occupancy at all times, controller 210 may provide substantial energy and/or cost savings by not requiring the ventilation rate to be at the maximum ventilation rate during occupied time periods.

In one illustrative embodiment, and prior to operating controller 210, the system may be commissioned based on a minimum and a maximum ventilation rate by, for example, changing the damper positions between minimum and maximum openings and/or changing a fan speed (e.g. of fan 119) between a low and a high setting. As used herein, commissioning may refer to, among other things, a calibration of the system during initial installation of the system, or a re-calibration of the system during a subsequent system checkout (e.g. to ensure proper functioning after the initial calibration).

The calibration/commissioning process may include calibrating minimum and maximum damper position settings based on desired minimum and maximum ventilation rates. These damper settings are sometimes called out in the HVAC system design documents for the building supplied by an engineering firm that designed the system, and may be expressed as a percentage of ventilation. To program the system's minimum and maximum ventilation rates, temporary calibration sensors may be placed at the outside air intake 108, the return air duct 112 and/or at the mixed air duct 132, if permanent system sensors are not available. In one example, temperature may be used to measure ventilation rate. In some cases, a minimum differential of 10 degrees Fahrenheit is required between the return air temperature and the outdoor air temperature to conduct the calibration. Once this condition is met, and the following readings may be collected, and the readings may be used as inputs to Equation 1 below:

$$(OAT-RAT) \times \% \text{ Ventilation} + RAT = MAT \quad \{\text{Equation 1}\}$$

where OAT=Outside air temperature, RAT=Return air temperature, and MAT=Mixed air temperature. During the calibration, the outdoor and/or return air dampers may be repositioned until the correct ventilation percentage (% Ventilation) is achieved for each minimum and maximum ventilation settings. The controller 210 may then be programmed to interpolate an intermediate ventilation rate, depending on actual, sensed or scheduled occupancy, by modulating between these two calibrated damper positions. This calibration may be performed with a single speed for fan 119 of the HVAC system 102.

In some cases, the fan 119 of an HVAC system 102 may be a multi-speed fan that has a maximum speed and a minimum speed, sometimes with a number of or infinite speeds therebetween. In some instances, the Controller 210 may be calibrated over multiple fan speeds in addition to or in place of minimum and maximum damper positions. When so provided, the use of a multi-speed fan 119 may allow the DCV system 130 to match fan speed and/or damper position to specific real or near real time ventilation demands. In some cases, the controller 210 may be commissioned at both a maximum fan speed and a minimum fan speed, for both a code mandated ventilation rate required for the building 104 during maximum occupancy (hereinafter Vbz) and for a code mandated minimum ventilation rate required for building material out-gassing (hereinafter Va).

In some instances, the controller 210 may include a fan speed input, user settings for Vbz at a minimum fan speed, Vbz at a maximum fan speed, Va at a minimum fan speed, and Va at a maximum fan speed, and corresponding outputs, thus allowing a user to provide a number of calibration points. A multi-speed fan 119 may be connected to a fan speed output of the controller 210, allowing the speed of the fan 119 to be controlled based on measured or expected ventilation demand. For example, in some instances, the controller 210 may be configured to interpolate or extrapolate from the calibration points such that the fan may operate at speeds other than the minimum and maximum fan speed, and in some cases, with dampers (if provided) between minimum and maximum openings. When so provided, the DCV system 130 may control the ventilation rates over a range of fan speeds and/or damper positions to help meet building code requirements while reducing energy demands of the fan 119.

Figure 3:
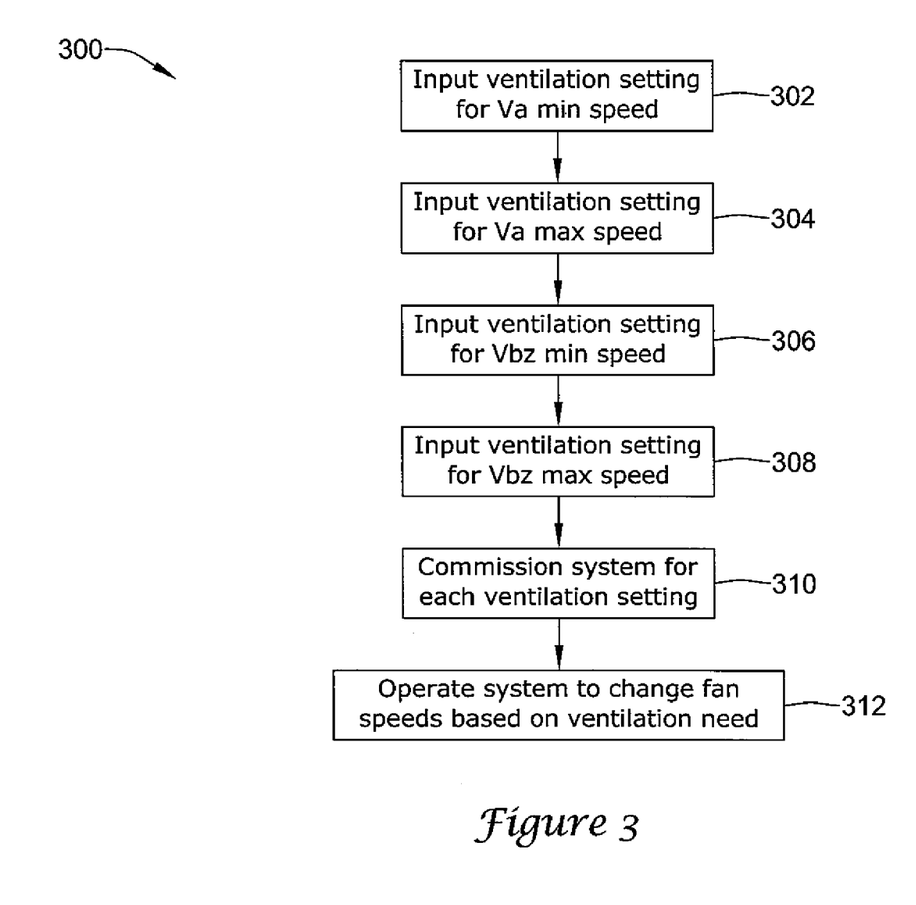
FIG. 3 is a flowchart showing an illustrative method of commissioning a multi-speed fan for use with a demand control ventilation (DCV) system.

FIG. 3 is a flowchart of an illustrative method 300 for programming a controller 210 for use with a multi-speed fan 119. The controller 210 may include a fan speed input and user settings to allow a user to input a total of four ventilation settings characterized by the minimum and maximum fan speeds. In the example shown, a user may enter a ventilation setting (e.g. as a percentage ventilation) into the controller corresponding to each of the following: Va minimum fan speed 302, Va maximum fan speed 304, Vbz minimum fan speed 306, and Vbz maximum fan speed 308. The controller 210 may then be calibrated 310 at each of the four reference ventilation rates 302, 304, 306, 308 using the DCV system 130. Once calibrated, the Controller 210 may operate the DCV system 130, modulating the fan speed of fan 119 between the minimum fan speed and the maximum fan speed and/or the position of the dampers between minimum and maximum open positions based on a sensed or expected ventilation need. It is contemplated that the DCV system 130 may modulate the fan speed instead of, or in addition to, controlling or modulating the damper position in order to achieve the desired ventilation rate. It is contemplated the controller 210 may be calibrated 310 for any number of fan speeds desired, such as, but not limited to one, two, three, four, or more. In some instances, the controller 210 may be programmed with a control algorithm such that the Controller 210 can modulate the fan speed between the maximum and minimum speeds and/or modulate the damper positions, without having to calibrate 310 the system at each speed and/or damper position.

Figure 4:
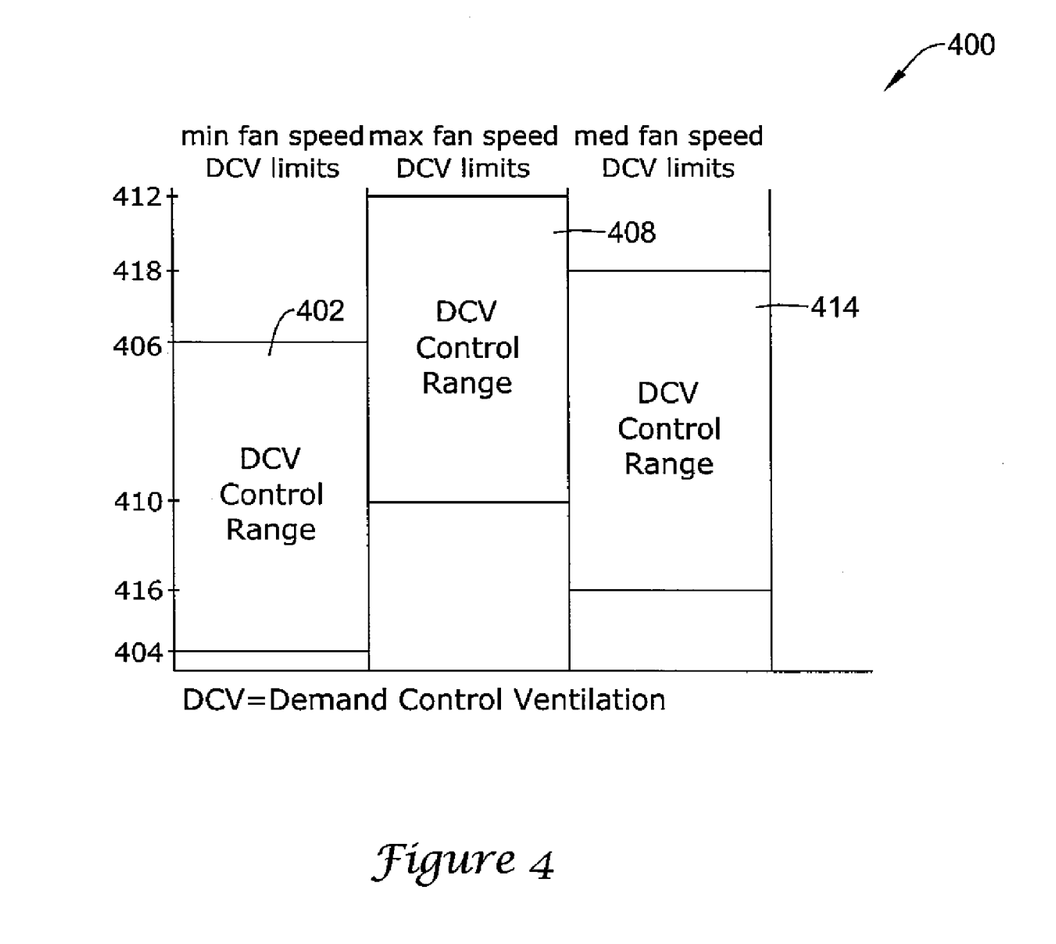
FIG. 4 is a graph illustrating various ventilation levels that can be achieved with a variable speed fan.

FIG. 4 is a graph 400 illustrating various ventilation levels that can be achieved with a variable speed fan and/or with modulating damper positions. As shown in the graph 400, a minimum fan speed may produce a demand control range 402 ranging from a minimum amount of ventilation (Va) 404 with a minimum damper position to a maximum amount of ventilation (Vbz) 406 with a maximum damper position. A maximum fan speed may have a demand control range 408 ranging from a minimum amount of ventilation (Va) 410 with the minimum damper position to a maximum amount of ventilation (Vbz) 412 with the maximum damper position. A medium or moderate fan speed may have a demand control range 414 ranging from a minimum amount of ventilation (Va) 416 with the minimum damper position to a maximum amount of ventilation (Vbz) 418 with the maximum damper position. In some instances the minimum and maximum damper positions may be the same for each demand ventilation range 402, 408, 414, while in other instances these damper positions may be different.

It is contemplated that in some instances, the demand control ranges 402, 408, 414 may overlap one another as shown. For example, the maximum speed control range 408 may, at least partially, overlap the demand control range 402 of the minimum fan speed and/or the demand control range 414 of the medium fan speed. In some embodiments, when the control ranges overlap 402, 408, 414, it may be desirable to operate the fan 119 at a lower speed while still providing the same amount of ventilation. As can be further seen in FIG. 4, the DCV system 130 may be capable of ventilating the building at a speed other than the maximum or minimum speed when the building is both occupied and unoccupied. As a result, and under some conditions, the DCV system 130, including a multi-speed plenum fan, may operate using less energy than a similar system with a single speed plenum fan. While graph 400 is illustrated as having three fan speeds, it is contemplated that the fan may have any number of fan speeds desired, such as, but not limited to one, two, four, five, or more, or may be a variable fan with virtually an infinite number of fan speeds.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A Demand Control Ventilation (DCV) system for a building, comprising:
   a damper having a range of damper positions, the damper for controlling a flow of outside air into the building;
   a multi-speed fan in fluid communication with the damper for drawing outside air through the damper and into the building;
   a controller, the controller configured to control the position of the damper such that a desired flow of outside air is drawn through the damper and into the building, wherein the position of the damper is dependent on both the desired flow of outside air and the speed of the multi-speed fan; and wherein the controller stores a damper position and a fan speed for each of two or more calibrated flows of outside air, the controller interpolates between at least one of the damper positions and the fan speeds for at least two of the calibrated flows to achieve the desired flow of outside air.

2. The Demand Control Ventilation (DCV) system of claim 1, wherein the desired flow of outside air is dependent on the occupancy or an expected occupancy of the building.

3. The Demand Control Ventilation (DCV) system of claim 2, wherein the multi-speed fan includes a lower fan speed and a higher fan speed, and wherein:
   at the lower fan speed, the desired flow of outside air can be drawn through the damper and into the building using a first damper position;
   at the higher fan speed, the desired flow of outside air can be drawn through the damper and into the building using a second damper position, wherein the second damper position is more open than the first damper position; and
   wherein the controller is configured to choose the lower fan speed and the first damper position to achieve the desired flow of outside air.

4. The Demand Control Ventilation (DCV) system of claim 1, wherein the Demand Control Ventilation (DCV) system includes an HVAC system, and wherein the multi-speed fan is part of the HVAC system.

5. The Demand Control Ventilation (DCV) system of claim 1, wherein the multi-speed fan is a plenum fan of the HVAC system.

6. The Demand Control Ventilation (DCV) system of claim 1, wherein the multi-speed fan is a two speed fan.

7. The Demand Control Ventilation (DCV) system of claim 1, wherein the multi-speed fan is a three speed fan.

8. The Demand Control Ventilation (DCV) system of claim 1, wherein the multi-speed fan is a variable speed fan.

9. The Demand Control Ventilation (DCV) system of claim 1, wherein the speed of the multi-speed fan can be modulated.

10. The Demand Control Ventilation (DCV) system of claim 1, wherein the damper can be modulated through the range of damper positions.

11. The Demand Control Ventilation (DCV) system of claim 1, wherein the damper has at least two positions.

12. The Demand Control Ventilation (DCV) system of claim 1, wherein the Demand Control Ventilation (DCV) system includes an economizer, and the damper is part of the economizer.

13. A Demand Control Ventilation (DCV) system for a building, comprising:
   a multi-speed fan in fluid communication with an air inlet for drawing outside air into the building;
   a controller, the controller configured to control the speed of the multi-speed fan such that a desired flow of outside air is drawn through the air inlet and into the building, wherein the speed of the fan is dependent on the desired flow of outside air; and
   wherein the controller stores a fan speed for each of two or more calibrated flows of outside air, and the controller interpolates between the fan speeds for at least two of the calibrated flows of outside air to achieve the desired flow of outside air.

14. The Demand Control Ventilation (DCV) system of claim 13, further comprises a damper having a range of damper positions, the multi-speed fan drawing air through the damper and into the building.

15. The Demand Control Ventilation (DCV) system of claim 13, wherein the fan speed for each of the two or more calibrated flows of outside air are determined during a commissioning process.

16. A control unit for controlling a Demand Control Ventilation (DCV) system of a building, wherein the Demand Control Ventilation (DCV) system includes a damper with a range of damper positions for controlling a flow of outside air into the building, and a multi-speed fan in fluid communication with the damper for drawing outside air through the damper and into the building, the control unit comprising:
   a controller configured to control the position of the damper such that a desired flow of outside air is drawn through the damper and into the building, wherein the position of the damper is dependent on both the desired flow of outside air and the speed of the multi-speed fan; and
   a memory coupled to the controller for storing a damper position and a fan speed for each of two or more calibrated flows of outside air, the controller interpolates between at least one of the damper positions and the fan speeds for at least two of the calibrated flows to achieve the desired flow of outside air.

17. The control unit of claim 16, wherein the desired flow of outside air is dependent on the occupancy or an expected occupancy of the building.

18. The control unit of claim 16, wherein the multi-speed fan includes a lower fan speed and a higher fan speed, and wherein:
   at the lower fan speed, the desired flow of outside air can be drawn through the damper and into the building using a first damper position;
   at the higher fan speed, the desired flow of outside air can be drawn through the damper and into the building using a second damper position, wherein the second damper position is more open than the first damper position; and
   wherein the controller is configured to choose the lower fan speed and the first damper position to achieve the desired flow of outside air.

19. The control unit of claim 16, wherein the speed of the multi-speed fan can be modulated.

* * * * *